United States Patent [19]
Kurilich, Jr.

[11] 3,753,579
[45] Aug. 21, 1973

[54] MOTORCYCLE-UTILITY TRAILER

[76] Inventor: Matthew Kurilich, Jr., 615 Reposado Dr., La Habra, Calif. 90631

[22] Filed: Aug. 9, 1971

[21] Appl. No.: 170,047

[52] U.S. Cl. ........ 280/400, 224/42.03 B, 280/179 R
[51] Int. Cl. ............................................. B60p 3/06
[58] Field of Search .................... 280/400, 402, 292, 280/34 A, 179 R; 224/42.03 B

[56] References Cited
UNITED STATES PATENTS

| | | | |
|---|---|---|---|
| 2,658,770 | 11/1953 | Koenig | 280/415 R X |
| 2,661,108 | 12/1953 | Horn et al. | 280/402 UX |
| 2,736,567 | 2/1956 | McMurray | 280/400 UX |
| 2,988,382 | 6/1961 | Holland | 280/402 X |
| 3,025,985 | 3/1962 | Crawford | 280/400 UX |
| 3,591,029 | 7/1971 | Coffey | 224/42.03 B |
| 3,625,545 | 12/1971 | Somers | 280/490 R X |

*Primary Examiner*—Leo Friaglia
*Attorney*—Philip M. Hinderstein

[57] ABSTRACT

A motorcycle-utility trailer characterized primarily by a small, lightweight, generally rectangular frame member having a side-to-side width which is substantially greater than the front-to-back length thereof whereby one or more motorcycles may be positioned on the trailer and carried in a direction transverse to their lengths. The trailer has no suspension and the wheels thereof are rigidly connected to the frame member. A coupling extends from the front of the frame member for connection of the trailer to a trailer hitch. First and second pairs of spaced posts extend vertically upwardly from the front and back of the frame member, the spacing between the posts of each pair being approximately equal to the spacing between the centers of the pegs of a motorcycle. Finally, means are provided for connecting the pegs of a pair of motorcycles to such posts to prevent lateral or longitudinal movement of the motorcycles but permitting limited vertical movement thereof.

15 Claims, 5 Drawing Figures

INVENTOR.
MATTHEW KURILICH, JR.

ATTORNEY

Patented Aug. 21, 1973

INVENTOR.
MATTHEW KURILICH, JR.

BY

ATTORNEY

MOTORCYCLE-UTILITY TRAILER

BACKGROUND OF THE INVENTION

1. Field of the Invention

The present invention relates to a motorcycle-utility trailer and, more particularly, to a small, inexpensive, lightweight, foldable trailer for use in carrying motorcycles or other objects.

2. Description of the Prior Art

Motorcycles are well on their way to becoming one of the most popular forms of recreation today. In addition to the large number of motorcycle tracks being built, the use of the motorcycle for riding on dirt paths and into wilderness areas is becoming increasingly more popular. On the other hand, in spite of the ever increasing use of motorcycles are recreational vehicles, most riders do not use motorcycles for basic transportation. Therefore, it is typical to transport the motorcycle to the place of use and only use it after arrival.

This being the case, it becomes necessary to provide a method for transporting a motocycle from one location to another without actually riding it. This can be done in one of two ways. On the one hand, many devices have been built for attachment to an automobile so that the motorcycle is actually strapped thereon. However, with the size of the average motorcycle built today, this is a cumbersome and difficult solution to the problem. The other alternative is to provide a separate trailer for transporting the motorcycle and many different types of trailers are presently available.

In spite of the numerous designs for motorcycle trailers on the market today, essentially all of them have several features in common. In the first instance, the trailer invariably carries the motorcycle in a direction parallel to the length thereof. When one considers that the length of an average motorcycle is at least 6 feet, it is realized that the body of the trailer must be greater than 6 feet. When the length of the trailer coupling is added to the trailer, it is easily seen that the length of such trailers approaches 10 feet.

Because of the size of such trailers, they generally are well constructed. As a result, the trailers are heavy and expensive. To support the weight of the trailer, the tires are usually quite large and the trailer includes a suspension between the tires and the frame itself. The size of the tires generally raises the frame a considerable distance off of the ground so that a ramp is usually required to load and unload the motorcycle.

The size and weight of these large motorcycle trailers and the fact that they take up a substantial amount of space behind the automobile, are not the only problems associated therewith. Once the motorcycle is positioned on the trailer, it becomes necessary to securely and rigidly connect the frame of the motorcycle to the frame of the trailer. This is generally done with ropes connected between the frame of the motorcycle and the trailer. However, two effects combine in placing severe burdens on the tie-down system. In the first instance, road vibrations on the trailer and motorcycle cause the motorcycle to constantly be in motion. Secondly, since the length of the bike is parallel to the direction of travel thereof, every time the automobile makes a turn, the motorcycle tends to tip over. Because of these factors, it is necessary to use very strong ropes to rigidly secure the motorcycle. Not only do the ropes have to be checked frequently, but because of the strength thereof, there is a possibility of damaging the suspension of the motorcycle.

SUMMARY OF THE INVENTION

According to the present invention there is provided a novel motorcycle-utility trailer which overcomes these problems of the prior art. In the first instance, the present trailer has a front-to-back length which is substantially smaller than the side-to-side width thereof and the motorcycles are adapted to be positioned on the trailer and carried in a direction transverse to their lengths. As a result, the trailer takes up a very small amount of space behind the vehicle pulling the trailer. In addition, the trailer can be made quite small, lightweight and foldable so that the finished product is quite inexpensive. With a lightweight, small frame, small, 16 inch diameter wheels may conveniently be used whereby the bed of the trailer is close to the ground. As a result, the motorcycles may be easily loaded and unloaded from the trailer.

The present invention also eliminates the problem of securing the motorcycle to the trailer. More specifically, the present trailer includes a simple mechanism whereby only the pegs of the motorcycles are connected to the frame of the trailer and the motorcycle is permitted to move up and down in response to road vibrations. Since the suspension of the motorcycle is allowed to freely operate, it is possible to completely eliminate the need for any suspension on the trailer itself thereby further minimizing the size, weight, height and expense of the trailer. Furthermore, since the motorcycle is permitted to freely move, the heavy duty tie-downs are eliminated together with the need to frequently check their operation.

Briefly, the present motorcycle-utility trailer is characterized primarily by a small, lightweight, generally rectangular frame member having a side-to-side width which is substantially greater than the front-to-back length thereof whereby one or two motorcycles may be positioned on the trailer and carried in a direction transverse to their lengths. The present trailer has no suspension and the wheels thereof are rigidly connected to the frame member. A coupling extends from the front of the frame member for connection of the trailer to a trailer hitch. First and second pairs of spaced posts extend vertically upwardly from the front and back of the frame member, the spacing between the posts of each pair being approximately equal to the spacing between the centers of the pegs of a motorcycle. Finally, means are provided for connecting the pegs of a pair of motorcycles to such posts to prevent lateral or longitudinal movement of the motorcycles but permitting limited vertical movement thereof.

It is therefore an object of the present invention to provide a novel motorcycle-utility trailer.

It is a further object of the present invention to provide a small, inexpensive, lightweight, motorcycle-utility trailer.

It is a still further object of the present invention to provide a motorcycle-utility trailer characterized by a frame member having a side-to-side width which is substantially greater than the front-to-back length thereof.

It is another object of the present invention to provide a motorcycle-utility trailer for carrying one or more motorcycles in a direction transverse to their lengths.

It is still another object of the present invention to provide a motorcycle-utility trailer having no suspension per se in which the frame of a motorcycle mounted thereon is permitted freedom of vertical movement.

Still other objects, features and advantages of the present invention will become apparent to those skilled in the art from a reading of the following detailed description of the preferred embodiment constructed in accordance therewith, taken in conjunction with the accompanying drawings wherein like numerals designate like parts in the several figures and wherein:

DESCRIPTION OF THE PREFERRED EMBODIMENTS

Figure 1:
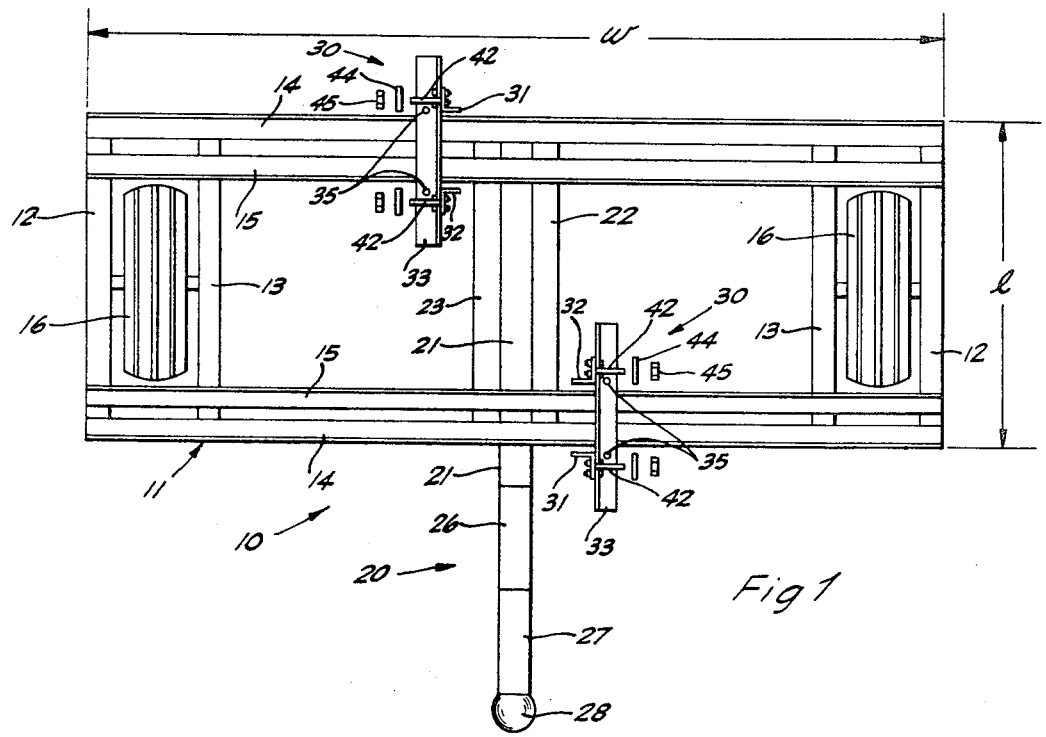
FIG. 1 is a top plan view of a preferred embodiment of motorcycle-utility trailer constructed in accordance with teachings of the present invention.

Referring now to the drawings and, more particularly, to FIG. 1 thereof, the present motorcycle-utility trailer, generally designated 10, comprises a generally rectangular frame member 11 having a side-to-side width "w" and a front-to-back length "1." According to the preferred embodiment of the present invention, the width "w" of frame 11 is substantially greater than the length "1" whereby one or more motorcycles may be positioned on frame 11 of trailer 10 and carried in a direction transverse to their lengths, as will be explained more fully hereinafter.

Figure 2:
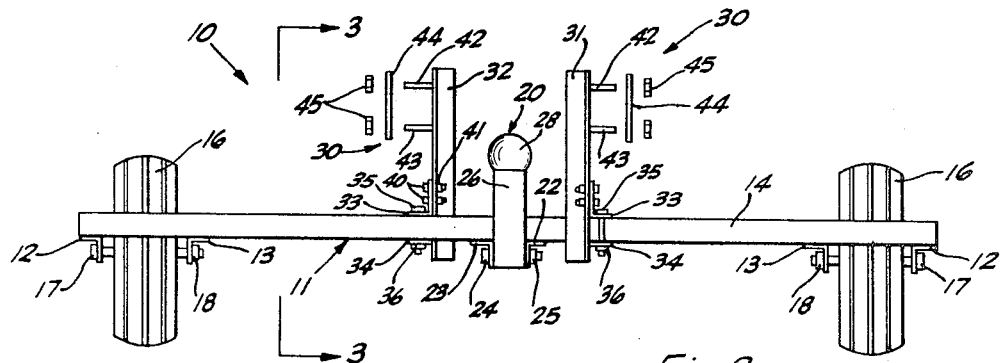
FIG. 2 is a front elevation view of the motorcycle-utility trailer of FIG. 1.

Frame 11 may be made in any convenient manner. According to the embodiment of the invention shown in FIGS. 1-3, frame 11 comprises a pair of rigid angles, 12 and 13, arranged in parallel, spaced relationship, at opposite sides of frame 11. As shown in FIG. 2, the angles 12 and 13 of each pair are positioned a short distance apart with one arm of each angle extending horizontally and the other arm of each angle extending vertically downwardly. Angle 12 of each pair forms the outer extremity of frame 11, as shown.

Figure 3:
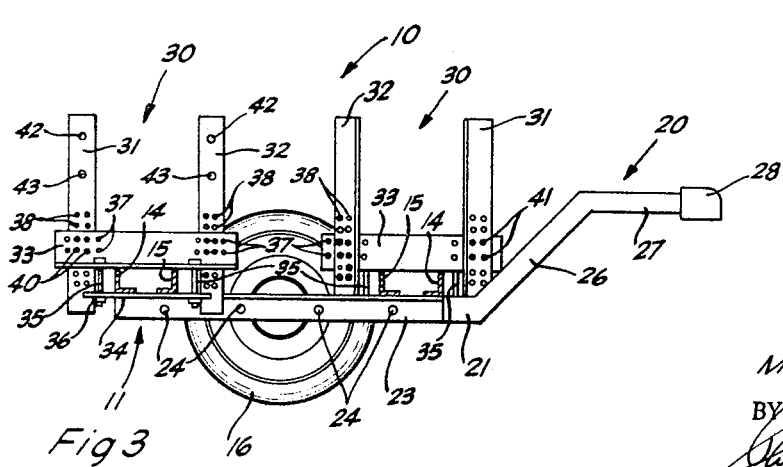
FIG. 3 is a sectional view taken along the line 3—3 in FIG. 2.

Frame 11 further comprises a pair of rigid angles, 14 and 15, arranged in parallel, spaced relationship, perpendicular to angles 12 and 13, at the front and back of frame 11. As shown in FIGS. 1 and 3, the angles 14 and 15 of each pair are positioned a short distance apart with one arm of each angle extending horizontally and the other arm of each angle extending vertically upwardly. Angle 14 of each pair forms the outer extremity of frame 11, as shown. As may be gathered from FIGS. 1-3, angles 14 and 15 are positioned above angles 12 and 13 and the horizontal arms of such angles are connected together by welding or any other convenient technique. Each pair of angles 14 and 15 defines an elongated channel for receiving and supporting the wheels of a motorcycle, as will be explained more fully hereinafter.

After connection, it is seen that angles 12 define the sides of frame 11 whereas angles 14 define the leading and trailing edges thereof. Angles 13 are spaced a short distance from angles 12 for reception of wheels 16 therebetween. As shown most clearly in FIG. 2, wheels 16 may be simply connected between angles 12 and 13 by passing a bolt 17 through angle 12, through a wheel bearing, not shown, and then through angle 13. Finally, a nut 18 is connected to the threaded end of bolt 17. In this manner, wheels 16 may be readily removed from frame 11.

In order to connect trailer 10 to an automobile for towing thereof, trailer 10 includes a hollow, rectangular, unitary post 20 which extends in a generally horizontal direction from the front of trailer 10. Post 20 may include a first section 21 which may be connected to frame 10 in any convenient manner. For example, frame 11 may include another pair of angles 22 and 23 which are arranged in parallel, spaced relationship, on opposite sides of the centerline of frame 11, by an amount equal to the width of section 21 of post 20. As shown most clearly in FIGS. 1 and 2, each of angles 22 and 23 may have one arm positioned horizontally and connected, such as by welding, to the horizontal arms of angles 14 and 15. The other arms of angles 22 and 23 then extend vertically downwardly. Section 21 of post 20 may then extend between angles 22 and 23 and be connected thereto by passing one or more bolts 24 through angles 22 and 23 and section 21 of post 20. Bolts 24 would then be secured by means of suitable nuts 25.

Returning now to FIG. 3, it will be appreciated that because of the small, lightweight construction of trailer 10, it may be made with very small wheels and positioned close to the ground. Therefore, section 21 of post 20 would be too low for direct connection to the ball of a trailer hitch. Accordingly, unitary post 20 includes a second section 26 which extends upwardly from section 21 at any suitable angle, such as 45°. Section 26 permits elevation of post 20 to a height sufficient for connection to the ball of a trailer hitch. Finally post 20 includes a third section 27 which extends horizontally from section 26 and which terminates in a trailer coupling 28.

Trailer 10 further includes means, generally designated 30, for connecting one or more motorcycles positioned on frame 11 thereto. Such connecting means is designed to prevent lateral or longitudinal movement of a motorcycle but to permit limited vertical movement thereof. According to the preferred embodiment of the present invention, each of connecting means 30 includes a pair of spaced posts 31 and 32 which extend vertically upwardly from frame member 11. Posts 31 and 32 may be flat plates or may be angles or "T's" for added support.

Posts 31 and 32 are adapted to be rigidly connected to frame member 11 in such a manner that the height and spacing thereof is adjustable. For this purpose, connecting means 30 includes a rigid angle 33 having one arm extending horizontally and another arm extending vertically upwardly. The horizontal arm of angle 33 is adapted to rest on the top edges of the vertical arms of angles 14 and 15, transverse to the lengths thereof. Such horizontal arm of angle 33 also has a pair of spaced holes therein. An elongated plate 34, having a similar pair of spaced holes therein, is adapted to be positioned beneath angles 14 and 15, in contact with the horizontal arms thereof. By extending first and second bolts 35 through the respective holes in angle 33 and plate 34, and by securing bolts 35 with nuts 36, angle 33 may be rigidly connected to angles 14 and 15, but in such a manner that the position thereof along angles 14 and 15 is adjustable.

The vertical arm of angle 33 may include a series of holes 37 therein, adjacent the opposite ends thereof. Each of posts 31 and 32 may include a series of holes 38 therein, adjacent the bottom thereof, the arrangement of holes 38 being the same as the arrangement of holes 37. Therefore, posts 31 and 32 may be connected to the opposite ends of angle 33 by passing two or more bolts 40 through holes 37 and 38 and securing such bolts 40 with nuts 41. In this manner, both the spacing between and the height of each of posts 31 and 32 may be readily adjusted to accomodate different sizes of motorcycles, as will be explained more fully hereinafter.

Each of posts 31 and 32 supports first and second vertically spaced bolts 42 and 43 which are parallel and extend horizontally, in the same direction, from each of posts 31 and 32. As shown most clearly in FIGS. 1 and 2, bolts 42 and 43 connected to posts 31 and 32 of one connecting means 30 extend in the same direction, which direction is opposite to that of bolts 42 and 43 connected to posts 31 and 32 of the other connecting means 30. The reason for this will appear more fully hereinafter.

Finally, means 30 includes a plurality of plates 44 having spaced holes therein, the spacing between said holes being equal to the spacing between bolts 42 and 43, whereby bolts 42 and 43 may extend through the holes in plates 44. A plurality of nuts 45 are also provided for engaging the threaded ends of bolts 44 to prevent removal of plates 44 therefrom.

Figure 4:
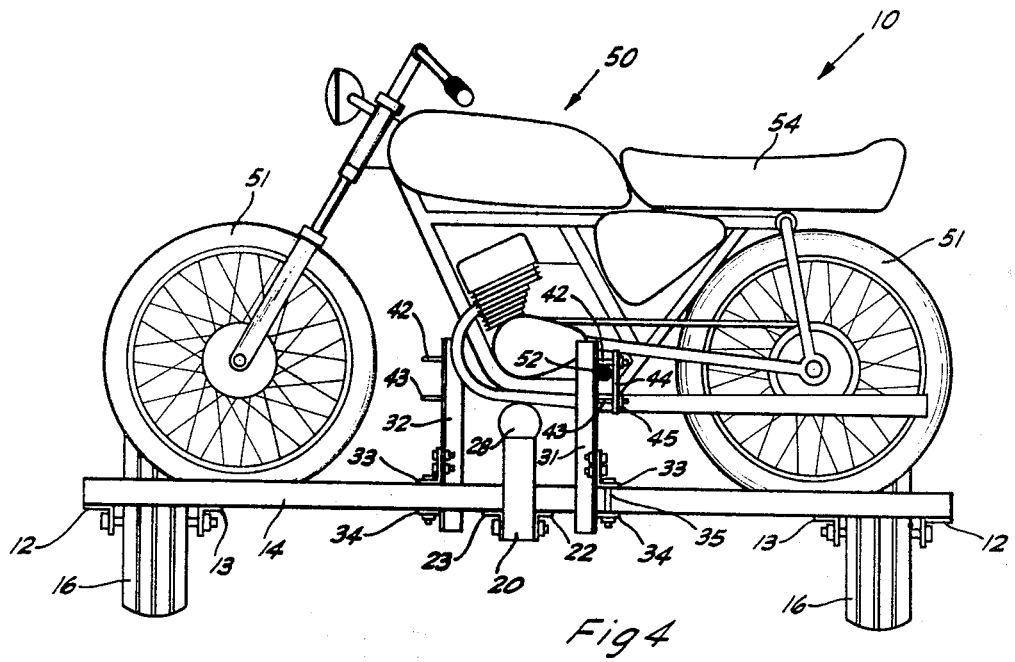
FIG. 4 is a front elevation view, similar to FIG. 2, of the present motorcycle-utility trailer showing a single motorcycle mounted thereon.
Figure 5:
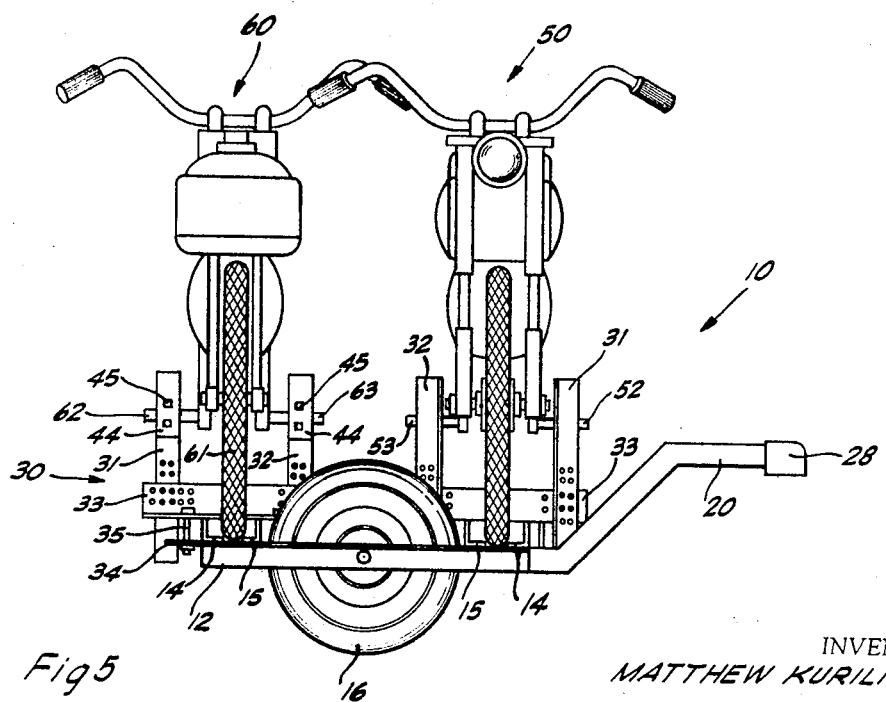
FIG. 5 is a side elevation view of the motorcycle-utility trailer of FIG. 4, showing two motorcycles mounted thereon.

In operation, and with reference to FIGS. 4 and 5, frame 11 is adapted to have one or more motorcycles positioned thereon so as to be carried in a direction transverse to their lengths. More specifically, a first motorcycle 50 may be driven onto trailer 10, from the right side thereof as viewed in FIG. 4, with the wheels 51 thereof resting on and riding through the channel formed between angles 14 and 15. The width "w" of trailer 10 would be approximately 6 feet, the average length of a motorcycle so that motorcycle 50 extends approximately for the same distance as the width of trailer 10.

The spacing between posts 31 and 32 is adjusted so that they contact the pegs 52 and 53, on opposite sides of motorcycle 50, approximately in the centers thereof. In addition, the height of posts 31 and 32 is adjusted so that with a rider on the seat 54 of motorcycle 50, the suspension of motorcycle 50 is depressed sufficiently to permit pegs 52 and 53 to easily pass between bolts 42 and 43. Then, once motorcycle 50 is positioned as shown in FIG. 4, removal of the weight of the rider from seat 54 will allow the suspension of motorcycle 50 to rise, hooking pegs 52 and 53 under bolts 42. This moderate pressure will hold motorcycle 50 in place until connection is completed. Such connection is completed by positioning a plate 44 on bolts 42 and 43 of each of posts 31 and 32 and by securing plates 44 with nuts 45.

According to the preferred embodiment of the present invention this connection of motorcycle 50 to frame member 11 is such that the suspension of motorcycle 50 is not impaired in any way. Motorcycle 50 is prevented from moving laterally or longitudinally because of the straddling action of posts 31 and 32 on opposite sides thereof. On the other hand, motorcycle 50 is permitted limited vertical movement between bolts 42 and 43.

Another advantage accrues from securing motorcycle 50 by pegs 52 and 53 thereof. The pegs of motorcycles generally are positioned close to a pivot point of the frame of the motorcycle. Therefore, even if pegs 52 and 53 are rigidly connected to posts 31 and 32, the frame of motorcycle 50 may still pivot when trailer 40 is subjected to road vibrations, thereby preventing the possibility of any damage to the frame of motorcycle 50.

If it is desired to position a second motorcycle 60 on trailer 10, this may be done as shown in FIG. 5. More specifically, motorcycle 60 may be positioned adjacent and parallel to motorcycle 50, but facing in the opposite direction. The wheels 61 of motorcycle 60 would rest between rear angles 14 and 15. In addition, a second connecting means 30 would be utilized, as shown in FIGS. 1-2, to connect the pegs 62 and 63 of motorcycle 60 to frame 11, in the same manner previously described. In this manner, motorcycle 60 is connected to frame 11 so that lateral and longitudinal movement thereof is prevented but limited vertical movement is permitted.

It can therefore be seen that in accordance with the present invention there is provided a novel motorcycle-utility trailer which overcomes all of the problems present with prior art motorcycle trailers. In the first instance, trailer 10 has a front-to-back length "1" which is substantially smaller than the side-to-side width "w" and motorcycles 50 and 60 are adapted to be positioned on trailer 10 and carried in a direction transverse to their lengths. As a result, trailer 10 takes up a very small amount of space behind the vehicle pulling the trailer. Furthermore, because of the smallness of trailer 10, it may be conveniently used for storing motorcycles 50 and 60.

Trailer 10 is not only small, but is also lightweight and can be readily folded so that the finished product is quite inexpensive. With a lightweight, small frame, small wheels, such as sixteen inch diameter wheels, may conveniently be used, positioning the bed of trailer 10 close to the ground for ease in loading and unloading the motorcycles.

With motorcycle-utility trailer 10, the problems previously encountered in securing motorcycles to trailers are also eliminated. More specifically, trailer 10 includes a simple mechanism including spaced posts 31 and 32 for preventing lateral movement of motorcycles 50 and 60 while permitting limited vertical movement and pivoting thereof. As a result, the suspensions of motorcycles 50 and 60 are fully operative in response to road vibrations. Since the suspensions of motorcycles 50 and 60 are allowed to freely operate, it is possible to completely eliminate the need for any suspension on trailer 10 thereby further minimizing the size, weight, height and expense of trailer 10. Furthermore, since motorcycles 50 and 60 are fully secured by the pegs thereof, the heavy duty tie-downs are eliminated together with the need to frequently check their operation.

While the invention has been described with respect to a preferred physical embodiment constructed in accordance therewith, it will be apparent to those skilled in the art that varius modifications and improvements may be made without departing from the scope and spirit of the invention. For example, the construction of motorcycle trailer 10 using rigid angles is only for exemplary purposes, it being appreciated by those skilled in the art that other constructions would be possible. Accordingly, it is to be understood that the invention is not to be limited by the specific illustrative embodiments, but only by the scope of the appended claims.

I claim:

1. A trailer comprising:
    a generally rectangular frame member having a side-to-side width which is substantially greater than the front-to-back length thereof;
    first and second wheels connected adjacent the opposite sides of said frame member;
    means including a coupling extending from the front of said frame member for connection of said trailer to a trailer hitch;
    at least one pair of spaced posts extending vertically upwardly from said frame member, the spacing between said posts being equal to the spacing between central portions of the pegs of a motorcycle adapted to be positioned on said trailer; and
    means for connecting said pegs of said motorcycle to said posts, said connecting means including means forming vertical channels for permitting limited vertical movement of said pegs of said motorcycle while preventing lateral or longitudinal movement thereof.

2. A trailer according to claim 1 further comprising:
    means for connecting said posts to said frame member, said means permitting adjustment of the height and spacing of said posts.

3. A trailer according to claim 1 wherein said connecting means comprises:
    first and second vertically spaced bolts rigidly connected to each of said posts and extending toward one side of said frame member, said motorcycle adapted to be driven onto said frame member until the pegs on opposite sides thereof extend between the bolts on said posts;
    a plate having spaced holes therein for receiving said bolts to prevent removal of said peg from therebetween; and
    first and second nuts for engaging said bolts for preventing removal of said plate.

4. A trailer according to claim 3 wherein said bolts are positioned adjacent one end of said posts and further comprising:
    means for connecting the other ends of said posts to said frame member, said means permitting adjustment of the height and spacing of said posts to accomodate different sizes of motorcycles.

5. A trailer comprising:
    a generally rectangular frame member having a side-to-side width which is substantially greater than the front-to-back length thereof;
    first and second wheels connected adjacent the opposite sides of said frame member;
    means including a coupling extending from the front of said frame member for connection of said trailer to a tailer hitch;
    a first pair of spaced posts extending vertically upwardly from the front of said frame member, the spacing between said posts being equal to the spacing between central portions of the pegs of a first motorcycle adapted to be positioned on said trailer and carried in a direction transverse to the length thereof;
    means for connecting said pegs of said first motorcycle to said posts of said first pair of posts;
    a second pair of spaced posts extending vertically upwardly from the back of said frame member, the spacing between said posts of said second pair of posts being equal to the spacing between central portions of the pegs of a second motorcycle adapted to be positioned on said trailer, parallel to said first motorcycle; and
    means for connecting said pegs of said second motorcycle to the posts of said second pair of posts.

6. A trailer according to claim 5 wherein the plane of said second pair of posts is parallel to the plane of said first pair of posts.

7. A trailer according to claim 5 wherein said connecting means comprises:
    first and second vertically spaced bolts rigidly connected to each of said posts of said pairs of posts, the bolts connected to said first-mentioned pair of posts extending toward one side of said frame member and the bolts connected to said second pair of posts extending toward the other side of said frame member, said motorcycles adapted to be driven onto said frame member from said opposite sides thereof until the pegs on opposite sides thereof extend between the bolts on said posts;
    four plates having spaced holes therein for receiving said bolts on said posts to prevent removal of said motorcycle pegs from therebetween; and
    a plurality of nuts for engaging said bolts for preventing removal of said plates.

8. A trailer according to claim 7 wherein said bolts are positioned adjacent one end of said posts and further comprising:
    means for rigidly connecting the other ends of said posts to said frame member, said means permitting adjustment of the height and spacing of said posts to accomodate different sizes of motorcycles.

9. A motorcycle trailer comprising:
    a generally rectangular frame member;
    at least one pair of spaced posts extending vertically upwardly from said frame member, the spacing between said posts being approximately equal to the distance between the centers of the pegs of a motorcycle; and
    means for connecting said pegs of said motorcycle to said posts, said connecting means including means forming vertical channels for permitting limited vertical movement of said pegs of said motorcycle while preventing lateral or longitudinal movement thereof.

10. A motorcycle trailer according to claim 9 wherein said frame member includes a post extending horizontally from the front thereof, said post terminating in a coupling for connection of said trailer to a trailer hitch.

11. A motorcycle trailer according to claim 10 wherein the end of said horizontally extending post, adjacent said coupling, is elevated relative to said frame member.

12. A motorcycle trailer according to claim 11 wherein said frame member has a side-to-side width which is substantially greater than the front-to-back length thereof and wherein said trailer is adapted to carry said motorcycle perpendicular to the direction of movement of said trailer.

13. A motorcycle trailer according to claim 9 wherein said connecting means comprises:
   first and second vertically spaced bolts rigidly connected to each of said posts and extending toward one side of said frame member, said motorcycle adapted to be driven onto said frame member until the pegs on opposite sides thereof extend between the bolts on said posts;
   a plate having spaced holes therein for receiving said bolts to prevent removal of said peg from therebetween; and
   first and second nuts for engaging said bolts for preventing removal of said plate.

14. A motorcycle trailer according to claim 13 wherein said bolts are positioned adjacent one end of said posts and further comprising:
   means for connecting the other ends of said posts to said frame member, said means permitting adjustment of the height and spacing of said posts to accomodate different sizes of motorcycles.

15. Apparatus for securing a motorcycle to a trailer comprising:
   at least one pair of posts;
   means for connecting first ends of said posts to the frame of a trailer so that said posts extend vertically upwardly therefrom, said means permitting adjustment of the height and spacing of said posts to accomodate different sizes of motorcycles; and
   means for connecting the pegs of said motorcycle to the other ends of said posts, said connecting means including means forming vertical channels for permitting limited vertical movement of said pegs of said motorcycle while preventing lateral or longitudinal movement thereof.

* * * * *